(12) United States Patent
Keesara et al.

(10) Patent No.: US 9,258,222 B2
(45) Date of Patent: Feb. 9, 2016

(54) IMPLEMENTING A SHORTEST PATH BRIDGING (SPB) NETWORK USING A VIRTUAL ROUTING AND FORWARDING (VRF) IDENTIFIER

(71) Applicant: Avaya, Inc., Basking Ridge, NJ (US)

(72) Inventors: Srikanth Keesara, Tewksbury, MA (US); Shahaji Bhosle, Bedford, MA (US)

(73) Assignee: AVAYA, INC., Basking Ridge, NJ (US)

( * ) Notice: Subject to any disclaimer, the term of this patent is extended or adjusted under 35 U.S.C. 154(b) by 567 days.

(21) Appl. No.: 13/627,501

(22) Filed: Sep. 26, 2012

(65) Prior Publication Data
US 2014/0086252 A1 Mar. 27, 2014

(51) Int. Cl.
*H04L 12/721* (2013.01)
*H04L 12/46* (2006.01)

(52) U.S. Cl.
CPC .............. *H04L 45/66* (2013.01); *H04L 12/465* (2013.01); *H04L 12/4658* (2013.01); *H04L 12/4666* (2013.01)

(58) Field of Classification Search
None
See application file for complete search history.

(56) References Cited

U.S. PATENT DOCUMENTS

| 7,249,194 | B2 * | 7/2007 | Suzuki | H04L 29/06 370/351 |
| 7,688,829 | B2 * | 3/2010 | Guichard et al. | 370/395.31 |
| 8,743,875 | B2 * | 6/2014 | Khera et al. | 370/390 |
| 2013/0322453 | A1 * | 12/2013 | Allan | 370/395.53 |

* cited by examiner

*Primary Examiner* — Ian N Moore
*Assistant Examiner* — Latresa McCallum
(74) *Attorney, Agent, or Firm* — Anderson Gorecki & Rouille LLP

(57) ABSTRACT

A method, apparatus and computer program product for using Backbone Virtual Local Area Network (BVLAN) as Virtual Routing and Forwarding (VRF) Identifier and shared Backbone Media Access Control (BMAC) tables to implement a Shortest Path Bridging (SPB) Layer 3 (L3) Virtual Services Network (VSN) is presented. For routed traffic, a Layer 3 (L3) Virtual Services Network (VSN) is associated with a unique Virtual Local Area Network Identifier (VLAN_ID) value in a first Shortest Path Bridging (SPB) network for routed traffic. The routed traffic comprises traffic sent over an SPB network interface, traffic received from an SPB interface, or traffic forwarded from a first SPB Network interface to a second SPB Network interface.

18 Claims, 4 Drawing Sheets

IMPLEMENTING A SHORTEST PATH BRIDGING (SPB) NETWORK USING A VIRTUAL ROUTING AND FORWARDING (VRF) IDENTIFIER

BACKGROUND

Data communication networks have become increasingly popular. Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, tablets and other types of consumer electronics connect to and transmit/receive data over the communication network and, hence, are users of the communication services offered by the communication network.

Network elements (e.g. Access Points, Mobility Switches and Edge Switches) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. The packets are transferred across the network in accordance with a particular protocol, such as the Internet Protocol (IP).

One type of network is known as a Shortest Path Bridging (SPB) network. SPB technology provides logical Ethernet networks on native Ethernet infrastructures using a link state protocol to advertise both topology and logical network membership. Packets are encapsulated at the edge either in MAC-in-MAC 802.1 ah or tagged 802.1Q/802.1ad frames and transported only to other members of the logical network. Unicast and multicast is supported and all routing is on symmetric shortest paths. Many equal cost shortest paths are supported.

Typically a packet enters an SPB transport network from a user network through a network device referred to as a Backbone Edge Bridge (BEB). The BEB functionality required for Layer 3 (L3) Virtual Services Network (VSN) requires the following operations. On the User to Network (UNI) ingress: the lookup of a Virtual Routing Destination Identifier, Internet Protocol Destination Address (VRD_ID, IP_DA) result points to a Media Access Control (MAC)-In-MAC encapsulation header that is added to the packet and sent into the SPB network. On the terminating Network to Network Interface (NNI) Ingress a lookup of the Service Instance Identifier (I-SID)→Virtual Routing and Forwarding Identifier (VRF_ID); and lookup (VRF_ID, IP_DA) to forward to determine which UNI to forward the packet out of. This is a fairly straightforward implementation on the flexible forwarding hardware that is used in network systems.

SUMMARY

Conventional mechanisms such as those explained above suffer from a variety of deficiencies. One such deficiency is that current commercial forwarding Application Specific Integrated circuits (ASICs), may not support this kind of operation. Any workarounds that are used achieve the overall behavior described above typically results in other undesirable behaviors like loss of throughput or sub-optimal Quality of Service (QOS) results. One alternative to this is to wait until silicon providers ship their next generation chips and hope that they have taken these requirements into consideration in those new chips.

The presently described method and apparatus tweaks/redefines how the L3VSN is supported or implemented, while at the same time delivering the services that the end user expects from the network. The presently described method and apparatus is able to be implemented on most current commercial forwarding ASICs, and provides an overall value proposition of SPB in terms of simplicity, small forwarding tables and pushing network intelligence to the edge.

Embodiments of the invention significantly overcome such deficiencies and provide mechanisms and techniques that provide a use of BVLAN as VRF Identifier and shared BMAC tables to implement SPB L3 VSN.

In a particular embodiment of a method for using Backbone Virtual Local Area Network (BVLAN) as Virtual Routing and Forwarding (VRF) Identifier and shared Backbone Media Access Control (BMAC) tables to implement a Shortest Path Bridging (SPB) Layer 3 (L3) Virtual Services Network (VSN). The method includes for routed traffic, a Layer 3 (L3) Virtual Services Network (VSN) is associated with a unique Virtual Local Area Network Identifier (VLAN_ID) value in a first Shortest Path Bridging (SPB) network for routed traffic. The routed traffic comprises traffic sent over an SPB network interface, traffic received from an SPB interface, or traffic forwarded from a first SPB Network interface to a second SPB Network interface.

Other embodiments include a computer readable medium having computer readable code thereon for providing using Backbone Virtual Local Area Network (BVLAN) as Virtual Routing and Forwarding (VRF) Identifier and shared Backbone Media Access Control (BMAC) tables to implement a Shortest Path Bridging (SPB) Layer 3 (L3) Virtual Services Network (VSN). The computer readable medium includes instructions wherein for routed traffic, a Layer 3 (L3) Virtual Services Network (VSN) is associated with a unique Virtual Local Area Network Identifier (VLAN_ID) value in a first Shortest Path Bridging (SPB) network for routed traffic. The routed traffic comprises traffic sent over an SPB network interface, traffic received from an SPB interface, or traffic forwarded from a first SPB Network interface to a second SPB Network interface.

A method, apparatus and computer program product for using Backbone Virtual Local Area Network (BVLAN) as Virtual Routing and Forwarding (VRF) Identifier and shared Backbone Media Access Control (BMAC) tables to implement a Shortest Path Bridging (SPB) Layer 3 (L3) Virtual Services Network (VSN) is presented. For routed traffic, a Layer 3 (L3) Virtual Services Network (VSN) is associated with a unique Virtual Local Area Network Identifier (VLAN_ID) value in a first Shortest Path Bridging (SPB) network for routed traffic. The routed traffic comprises traffic sent over an SPB network interface, traffic received from an SPB interface, or traffic forwarded from a first SPB Network interface to a second SPB Network interface.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides use of BVLAN as VRF Identifier and shared BMAC tables to implement SPB L3 VSN as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing use of BVLAN as VRF Identifier and shared BMAC tables to implement SPB L3 VSN explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
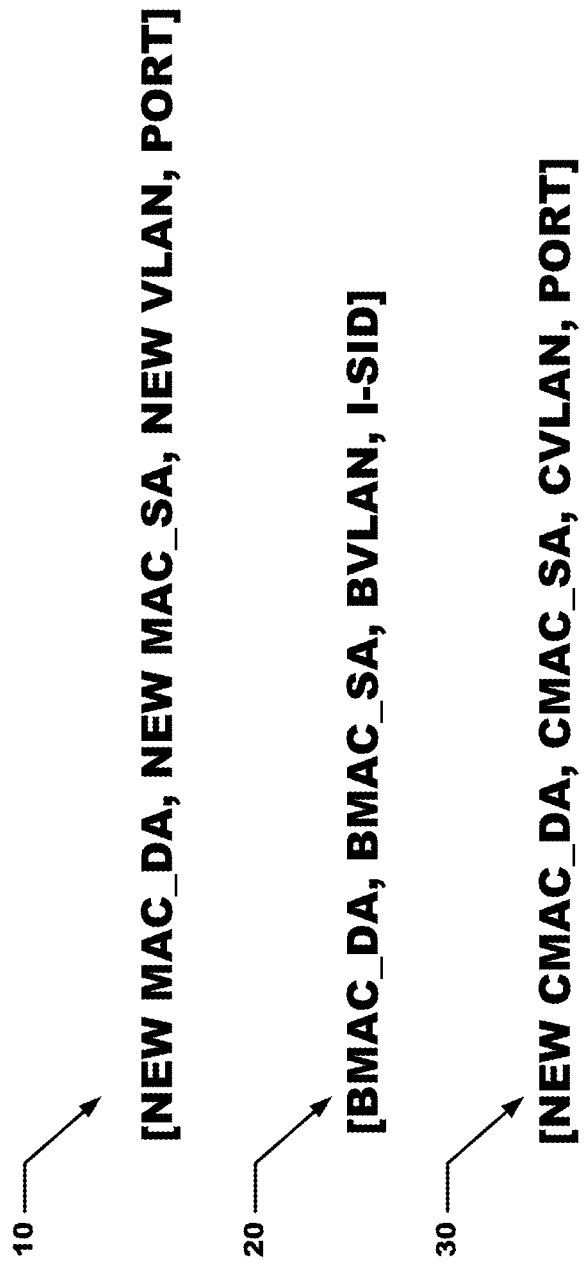
FIG. 1 shows conventional MAC-in-MAC headers and lookups in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Embodiments of the presently described use of BVLAN as VRF Identifier and shared BMAC tables to implement SPB L3 VSN introduces a new way of providing SPB L3 VSN. The control plane largely remains the same. On the data plane for a BVLAN, support is provided for multiple VLAN_ID (or VID values) pointing to the same exact BMAC forwarding table. The BMAC forwarding table itself is derived using standard SPB rules, except that now this is applied to other VLAN_IDs that are not visible to the control plane. Each L3VSN is associated with a unique VLAN_ID value. Packets on the NNI ports bearing this VLAN_ID value belong to the L3VSN. When routing packets for a L3VSN into the SPB Network, the packet is not encapsulated in a Mac-in-Mac header. Instead standard IP over Ethernet routing is used and the BVLAN_ID reserved for the L3VSN is used as the egress VLAN_ID. For terminating unicast packets received on NNI ingress direct (VLAN_ID, My Node BMAC_DA) packets into a separate VRF for each unique VLAN_ID. The VLAN_ID→VRF_ID association is supported on most commercial forwarding ASICs that support VRF functionality.

Using the above, the UNI→NNI forwarding paradigm is (VRF_ID, IP_DA)→(VLAN_ID, MAC_DA, MAC_SA) next-hop where the VLAN_ID shares the same L2 MAC Table entries as one of the BVLANs in the SPB Network and the MAC addresses happen to be BMAC addresses. This is standard VRF IP over Ethernet forwarding and is widely supported on current commercial forwarding ASICs.

The NNI→UNI forwarding uses the (VLAN_ID, MAC_DA) to determine VRF_ID. This also standard for VRF IP over Ethernet Forwarding and is widely supported on commercial forwarding ASICs.

There are no internal loopbacks or workarounds involved, therefore there is no loss of throughput or shaping currently associated with such workarounds in conventional ASICs. Also, there is no encapsulation, therefore no loss of throughput for L3VSN unicast traffic. Use of the shared MAC table means that the switch will have to maintain fewer MAC records. This means that the number of (BVLAN, BMAC) records is the same as standard 802.1aq (at least on ASICs that have hardware support for shared VLAN_MAC tables).

One of the consequences of using the VLAN_ID values as VRF demultiplexers is that there are fewer VLAN_ID values available on NNI interfaces for non SPB traffic. This is generally not a concern since the intent is to use SPB as the technology to provide all services in the network, but it might require migration plans from legacy to newer configurations to take this into account. Another consequence is that this will limit the number of possible L3VSNs using this method to a theoretical limit of 4000 and a more practical limit of between 1000-2000. In extremely large networks this might not enough. In most typical enterprise networks though this would still be considered highly scalable.

One conventional methodology takes the approach of extending the SPB control plane only for the purpose of advertising services. It explicitly does not use SPB to compute forwarding records on the edge devices. It intends to maintain forwarding behaviors and state analogous to a SPB network that originates at the distribution layer (only extends service advertisements to the edge). It also relies on an "SPB BEB" at the traditional distribution layer to maintain service state (manifested as user MAC tables or VRF/GRT routes tables) on behalf of the edge devices. The expectations that the number of switches in a traditional distribution/core portion of the networks is a reasonable sized network for operation as a single flat SPB network without having to rely on multi area/multi region/multi instance methods in ISIS/SPB.

The presently described invention actually extends the computational boundary of the SPB network to the edge and originates BMAC addresses right from the edge. The traditional distribution layer becomes more of a BCB transit point that does not have to maintain per service state for services originating from the edge devices connected to it. The argument for this approach is that the more intractable problem on the edge is the commercial silicon stubbornness. The expected impact of extremely large SPB clouds overwhelming the "tiny CPUs" of the edge devices in terms of computational capacity is expected to be addressed using standard or to be enhanced ISIS rules around breaking up one flat network into multiple areas/regions/SPB instances.

Referring now to FIG. 1, when a packet is forwarded into an SPPB transport network, conventionally the packet is encapsulated in a MAC-in-MAC header 10. The MAC-in-MAC header allows the packet to be forwarded through the SPB transport network efficiently. Upon egress of the packet from the SPB transport network the MAC-in-MAC encapsulation is removed. Certain current commercial forwarding ASICs however cannot provide the MAC-in-MAC encapsulation. To address this issue, the following methodology is performed. When a packet is received, at a UNI to NNI device, a conventional IP DA lookup is performed using the standard IP over Ethernet routing except that the VLAN_ID reserved for the L3VSN is used as the egress VLAN_ID as shown in header 20. For terminating unicast packets received on NNI ingress the (VLAN_ID, My Node BMAC_DA) packets are directed into a separate VRF for each unique VLAN_ID as shown in header 30. The VLAN_ID→VRF_ID association is supported on most commercial forwarding ASICs that support VRF functionality.

Figure 2:
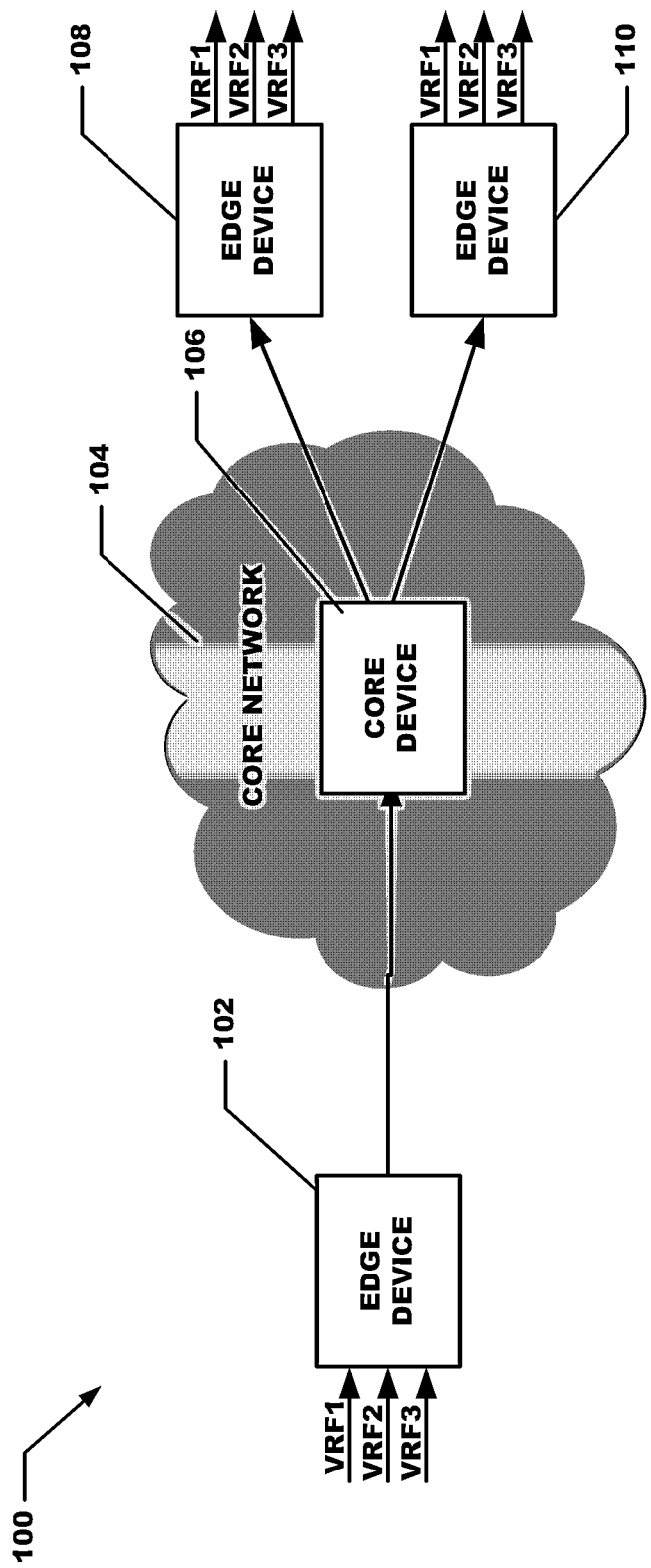
FIG. 2 depicts a network providing the use of BVLAN as VRF Identifier and shared BMAC tables to implement SPB L3 VSN in accordance with embodiments of the invention.

Referring now to FIG. 2, a network environment 100 supporting the presently described use of VLAN as VRF identifier and shared BMAC tables to implement an SPB L3 VSN is shown. An L3VSN is also referred to as a VRF, a L3VPN and an IPVPN and the terms are used interchangeable herein.

Environment 100 includes a first edge device 102 in communication with a core network 104 which is in communication with edge device 108 and edge device 110. Core network 104 is an SPB network, and includes at least one core device 106. VRF1, VRF2 and VRF3 are shown extending from the first edge device 102, through core network 104 to edge device 108 and edge device 110. Each of VRF1, VRF2 and VRF3 are associated with a unique VLAN_ID. A plurality of the VLAN_IDs that identify different L3VSNs in the SPB network use the L2 MAC forwarding table records of the same BVLAN_ID in the SPB Network. This aids in keeping the size of the L2 forwarding table small.

When a packet that is part of VRF1, VRF2 or VRF3 arrives at EDGE device of core network 104, an IP DA lookup is performed. This includes replacing an original Ethernet header of an incoming packet with a new Ethernet header where a source Media Access Control (MAC) address is a Backbone Media Access Control (BMAC) address of the node, a destination MAC address is the Backbone MAC address of another node in the SPB network and the VLAN is the unique VLAN_ID used to identify the L3VSN traffic in the SPB network. The receiving node will verify that a Destination MAC address is the BMAC address of the receiving device, the source MAC address is the BMAC address of another device in the network, and the VLAN is a VLAN_ID used to uniquely identify one of the L3VSNs hosted on the receiving device. For forwarding L3VSN traffic from one SPB network interface to another SPB network interface a lookup for (VLAN_ID, MAC_DA) with the VLAN_ID being the VLAN_ID associated with the L3VSN is used. Upon the packet exiting the core network 104, the packet is directed into a separate VRF for each unique VLAN_ID.

Figure 3:
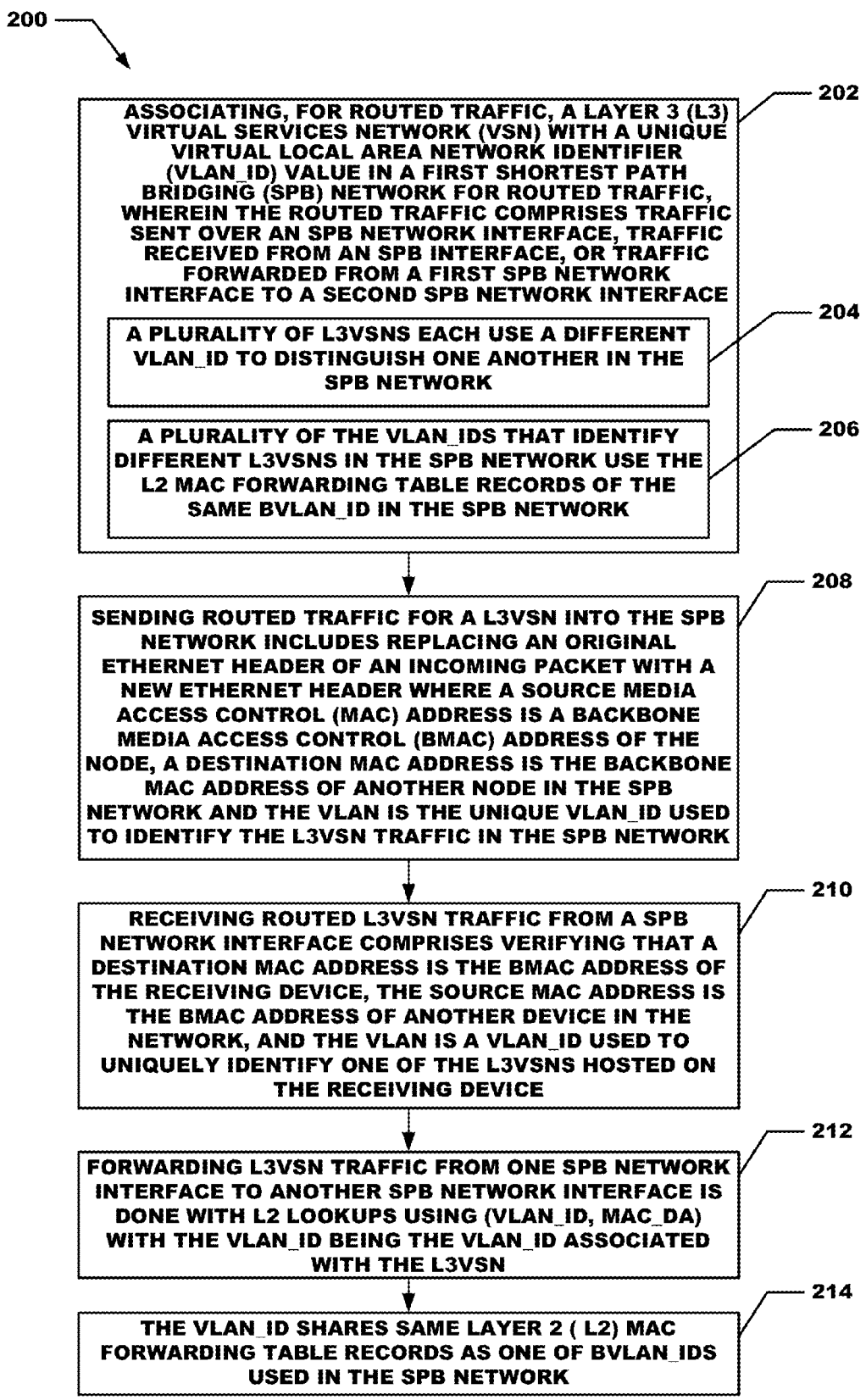
FIG. 3 illustrates a flow diagram for a particular method providing for the use of BVLAN as VRF Identifier and shared BMAC tables to implement SPB L3 VSN in accordance with embodiments of the invention.

A flow chart of a particular embodiment of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, in a particular embodiment of a method 200 for providing the use of BVLAN as VRF Identifier and shared BMAC tables to implement SPB L3 VSN is shown. Method 200 begins with processing block 202 which discloses associating, for routed traffic, a Layer 3 (L3) Virtual Services Network (VSN) with a unique Virtual Local Area Network Identifier (VLAN_ID) value in a first Shortest Path Bridging (SPB) network for routed traffic, wherein said routed traffic comprises traffic sent over an SPB network interface, traffic received from an SPB interface, or traffic forwarded from a first SPB Network interface to a second SPB Network interface. As further shown in processing block 204 wherein a plurality of L3VSNs each use a different VLAN_ID to distinguish one another in the SPB network. Processing block 206 shows wherein a plurality of the VLAN_IDs that identify different L3VSNs in the SPB network use the L2 MAC forwarding table records of the same BVLAN_ID in the SPB Network. An L3VSN is also referred to as a VRF, a L3VPN and an IPVPN and the terms are used interchangeable herein.

Processing block 208 states sending routed traffic for a L3VSN into the SPB network includes replacing an original Ethernet header of an incoming packet with a new Ethernet header where a source Media Access Control (MAC) address is a Backbone Media Access Control (BMAC) address of the node, a destination MAC address is the Backbone MAC address of another node in the SPB network and the VLAN is the unique VLAN_ID used to identify the L3VSN traffic in the SPB network.

Processing block 210 recites receiving routed L3VSN traffic from a SPB network interface comprises verifying that a Destination MAC address is the BMAC address of the receiving device, the source MAC address is the BMAC address of another device in the network, and the VLAN is a VLAN_ID used to uniquely identify one of the L3VSNs hosted on the receiving device.

Processing block 212 discloses forwarding L3VSN traffic from one SPB network interface to another SPB network interface is done with L2 lookups using (VLAN_ID, MAC_DA) with the VLAN_ID being the VLAN_ID associated with the L3VSN.

Processing block 214 states the VLAN_ID shares same Layer 2 (L)2 MAC forwarding table records as one of BVLAN_IDs used in the SPB network. This aids in keeping the size of the L2 forwarding table small.

Figure 4:
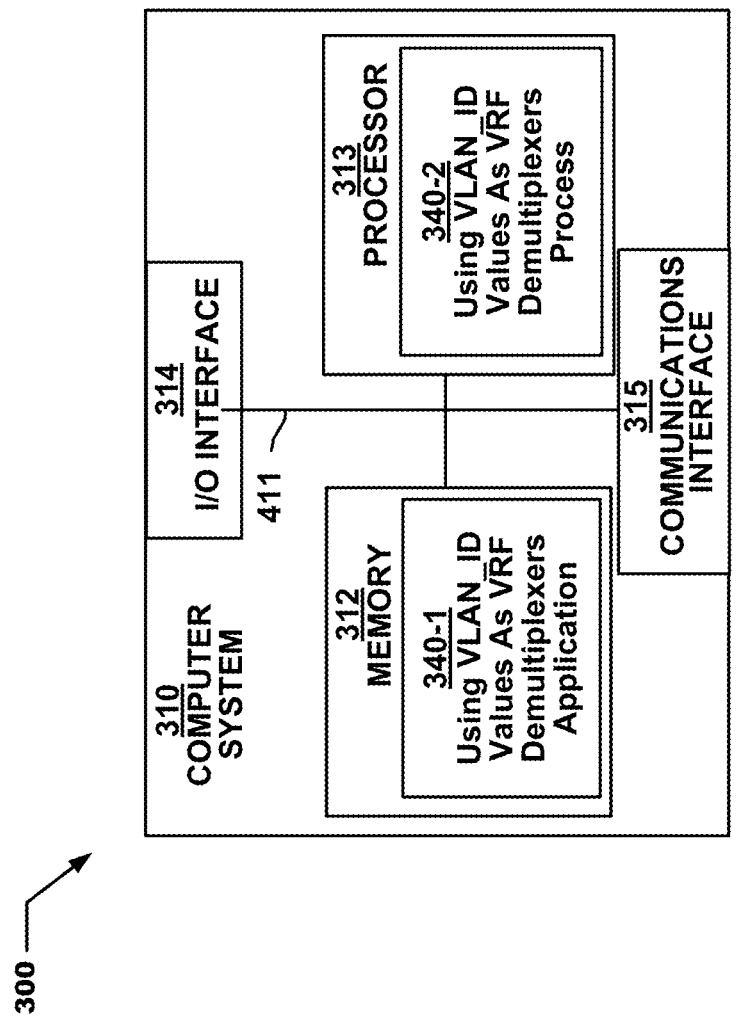
FIG. 4 illustrates an example computer system architecture for a computer system that provides for the use of BVLAN as VRF Identifier and shared BMAC tables to implement SPB L3 VSN in accordance with embodiments of the invention.

FIG. 4 is a block diagram illustrating example architecture of a computer system 310 that executes, runs, interprets, operates or otherwise performs a using VLAN_ID values as VRF demultiplexers operating application 340-1 and using VLAN_ID values as VRF demultiplexers operating process 340-2 suitable for use in explaining example configurations disclosed herein. The computer system 310 may be any type of computerized device such as a personal computer, workstation, portable computing device, console, laptop, network terminal or the like. An input device 316 (e.g., one or more customer/developer controlled devices such as a keyboard, mouse, etc.) couples to processor 313 through I/O interface 314, and enables a customer 308 to provide input commands, and generally control the graphical customer interface 360 that the using VLAN_ID values as VRF demultiplexers operating application 340-1 and process 340-2 provides on the display 330. Essentially, the graphical user interface 360 is where the customer 308-1 performs their 'online banking', specifying which bills are to be paid electronically, when those bills are to be paid, and the amount to be paid. As shown in this example, the computer system 310 includes an interconnection mechanism 311 such as a data bus or other circuitry that couples a memory system 312, a processor 313, an input/output interface 314, and a communications interface 315. The communications interface 315 enables the computer system 310 to communicate with other devices (i.e., other computers) on a network (not shown).

The memory system 312 is any type of computer readable medium, and in this example, is encoded with a using VLAN_ID values as VRF demultiplexers operating application 340-1 as explained herein. The using VLAN_ID values as VRF demultiplexers operating application 340-1 may be embodied as software code such as data and/or logic instructions (e.g., code stored in the memory or on another computer readable medium such as a removable disk) that supports processing functionality according to different embodiments described herein. During operation of the computer system 310, the processor 313 accesses the memory system 312 via the interconnect 311 in order to launch, run, execute, interpret or otherwise perform the logic instructions of a using VLAN_ID values as VRF demultiplexers operating application 340-1. Execution of a using VLAN_ID values as VRF demultiplexers operating application 340-1 in this manner produces processing functionality in the using VLAN_ID values as VRF demultiplexers operating process 340-2. In other words, the using VLAN_ID values as VRF demultiplexers operating process 340-2 represents one or more portions or runtime instances of a using VLAN_ID values as VRF demultiplexers operating application 340-1 (or the entire a using VLAN_ID values as VRF demultiplexers operating application 340-1) performing or executing within or upon the processor 313 in the computerized device 310 at runtime.

It is noted that example configurations disclosed herein include the using VLAN_ID values as VRF demultiplexers operating application 340-1 itself (i.e., in the form of un-executed or non-performing logic instructions and/or data). The using VLAN_ID values as VRF demultiplexers operating application 340-1 may be stored on a computer readable medium (such as a floppy disk), hard disk, electronic, magnetic, optical, or other computer readable medium. A using VLAN_ID values as VRF demultiplexers operating application 340-1 may also be stored in a memory system 312 such as in firmware, read only memory (ROM), or, as in this example, as executable code in, for example, Random Access Memory (RAM). In addition to these embodiments, it should also be noted that other embodiments herein include the execution of a using VLAN_ID values as VRF demultiplexers operating application 340-1 in the processor 313 as the using VLAN_ID values as VRF demultiplexers operating process 340-2. Those skilled in the art will understand that the computer system 310 may include other processes and/or software and hardware components, such as an operating system not shown in this example.

During operation, processor 313 of computer system 300 accesses memory system 312 via the interconnect 311 in order to launch, run, execute, interpret or otherwise perform the logic instructions of the using VLAN_ID values as VRF demultiplexers application 340-1. Execution of using VLAN_ID values as VRF demultiplexers application 340-1 produces processing functionality in using VLAN_ID values as VRF demultiplexers process 340-2. In other words, the using VLAN_ID values as VRF demultiplexers process 340-2 represents one or more portions of the using VLAN_ID values as VRF demultiplexers application 340-1 (or the entire application) performing within or upon the processor 313 in the computer system 300.

It should be noted that, in addition to the using VLAN_ID values as VRF demultiplexers process 340-2, embodiments herein include the using VLAN_ID values as VRF demultiplexers application 340-1 itself (i.e., the un-executed or non-performing logic instructions and/or data). The using VLAN_ID values as VRF demultiplexers application 340-1 can be stored on a computer readable medium such as a floppy disk, hard disk, or optical medium. The using VLAN_ID values as VRF demultiplexers application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of using VLAN_ID values as VRF demultiplexers application 340-1 in processor 313 as the using VLAN_ID values as VRF demultiplexers process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a network device performs operations comprising:
    associating, for routed traffic, a Layer 3 (L3) Virtual Services Network (VSN) with a unique Virtual Local Area Network Identifier (VLAN_ID) value in a first Shortest Path Bridging (SPB) network for routed traffic, wherein said routed traffic comprises traffic sent over an SPB network interface, traffic received from an SPB interface, or traffic forwarded from a first SPB Network interface to a second SPB Network interface; and
    wherein said routed traffic associated with VSN is routed using Internet Protocol (IP) over Ethernet routing instead of Media Access Control (MAC)-in-MAC encapsulation;
    wherein sending routed traffic for a L3VSN into an SPB network includes replacing an original Ethernet header of an incoming packet with a new Ethernet header where a source Media Access Control (MAC) address is a Backbone Media Access Control (BMAC) address of a node, a destination MAC address is the Backbone MAC address of another node in the SPB network and a VLAN is the unique VLAN ID used to identify L3VSN traffic in the SPB network;
    wherein the memory is encoded with an application using VLAN ID values as Virtual Routing and Forwarding (VRF) demultiplexers.

2. The method of claim 1 wherein receiving routed L3VSN traffic from a SPB network interface comprises verifying that a Destination MAC address is the BMAC address of a receiving device, a source MAC address is the BMAC address of another device in a network, and a VLAN is a VLAN_ID used to uniquely identify one of the L3VSNs hosted on the receiving device.

3. The method of claim 1 wherein forwarding L3VSN traffic from one SPB network interface to another SPB network interface is done with Layer 2 (L2) lookups using (VLAN_ID, Media Access Control Destination Address (MAC_DA)) with the VLAN_ID being the VLAN_ID associated with the L3VSN.

4. The method of claim 3 wherein the VLAN_ID shares same Layer 2 L2 MAC forwarding table records as one of Backbone Virtual Local Area Network Identifiers (BVLAN_IDs) used in a SPB network.

5. The method of claim 1 wherein a plurality of L3VSNs each use a different VLAN_ID to distinguish one another in a SPB network.

6. The method of claim 5 wherein a plurality of the VLAN_IDs that identify different L3VSNs in the SPB network use the L2 MAC forwarding table records of a same BVLAN ID in the SPB Network.

7. A non-transitory computer readable storage medium having computer readable code thereon for using VLAN_ID values as Virtual Routing and Forwarding (VRF) demultiplexers, the medium including instructions in which a computer system performs operations comprising:
associating, for routed traffic, a Layer 3 (L3) Virtual Services Network (VSN) with a unique Virtual Local Area Network Identifier (VLAN_ID) value in a first Shortest Path Bridging (SPB) network for routed traffic, wherein said routed traffic comprises traffic sent over an SPB network interface, traffic received from an SPB interface, or traffic forwarded from a first SPB Network interface to a second SPB Network interface; and
wherein said routed traffic associated with VSN is routed using Internet Protocol (IP) over Ethernet routing instead of Media Access Control (MAC)-in-MAC encapsulation;
wherein sending routed traffic for a L3VSN into an SPB network includes replacing an original Ethernet header of an incoming packet with a new Ethernet header where a source Media Access Control (MAC) address is a Backbone Media Access Control (BMAC) address of a node, a destination MAC address is the Backbone MAC address of another node in the SPB network and a VLAN is the unique VLAN ID used to identify L3VSN traffic in the SPB network; and
wherein the non-transitory computer readable storage medium having computer readable code thereon for using VLAN ID values as Virtual Routing and Forwarding (VRF) demultiplexers.

8. The computer readable storage medium of claim 7 wherein receiving routed L3VSN traffic from a SPB network interface comprises verifying that a Destination MAC address is the BMAC address of the receiving device, a source MAC address is the BMAC address of another device in a network, and a VLAN is a VLAN ID used to uniquely identify one of the L3VSNs hosted on the receiving device.

9. The computer readable storage medium of claim 7 wherein forwarding L3VSN traffic from one SPB network interface to another SPB network interface is done with Layer 2 (L2) lookups using (VLAN_ID, Media Access Control Destination Address (MAC_DA)) with the VLAN_ID being the VLAN_ID associated with the L3VSN.

10. The computer readable storage medium of claim 9 wherein the VLAN_ID shares same Layer 2 (L2) MAC forwarding table records as one of Backbone Virtual Local Area Network Identifiers (BVLAN_IDs) used in the SPB network.

11. The computer readable storage medium of claim 7 wherein a plurality of L3VSNs each use a different VLAN_ID to distinguish one another in a SPB network.

12. The computer readable storage medium of claim 11 wherein a plurality of the VLAN_IDs that identify different L3VSNs in the SPB network use the L2 MAC forwarding table records of a same BVLAN_ID in the SPB Network.

13. A computer system comprising:
a memory;
a processor;
a communications interface;
an interconnection mechanism coupling the memory, the processor and the communications interface; and
wherein the memory is encoded with an application using VLAN_ID values as Virtual Routing and Forwarding (VRF) demultiplexers, that when performed on the processor, provides a process for processing information, the process causing the computer system to perform the operations of:
associating, for routed traffic, a Layer 3 (L3) Virtual Services Network (VSN) with a unique Virtual Local Area Network Identifier (VLAN_ID) value in a first Shortest Path Bridging (SPB) network for routed traffic, wherein said routed traffic comprises traffic sent over an SPB network interface, traffic received from an SPB interface, or traffic forwarded from a first SPB Network interface to a second SPB Network interface, wherein said routed traffic associated with VSN is routed using Internet Protocol (IP) over Ethernet routing instead of Media Access Control (MAC)-in-MAC encapsulation;
wherein sending routed traffic for a L3VSN into an SPB network includes replacing an Currently amended Ethernet header of an incoming packet with a new Ethernet header where a source Media Access Control (MAC) address is a Backbone Media Access Control (BMAC) address of a node, a destination MAC address is the Backbone MAC address of another node in the SPB network and a VLAN is the unique VLAN ID used to identify L3VSN traffic in the SPB network.

14. The computer system of claim 13 wherein receiving routed L3VSN traffic from a SPB network interface comprises verifying that a Destination MAC address is the BMAC address of a receiving device, a source MAC address is the BMAC address of another device in a network, and a VLAN is a VLAN_ID used to uniquely identify one of the L3VSNs hosted on the receiving device.

15. The computer system of claim 13 wherein forwarding L3VSN traffic from one SPB network interface to another SPB network interface is done using the result Layer 2 (L2) lookups using (VLAN_ID, Media Access Control Destination Address (MAC_DA) with the VLAN_ID being the VLAN_ID associated with the L3VSN.

16. The computer system of claim 15 wherein the VLAN_ID shares same Layer 2 (L2) MAC forwarding table records as one of Backbone Virtual Local Area Network Identifiers (BVLAN_IDs) used in a SPB network.

17. The computer system of claim 13 wherein a plurality of L3VSNs each use a different VLAN_ID to distinguish one another in a SPB network.

18. The computer system of claim 17 wherein a plurality of the VLAN_IDs that identify different L3VSNs in the SPB network use the L2 MAC forwarding table records of a same BVLAN ID in the SPB Network.

* * * * *